United States Patent [19]
DeCecca et al.

[11] Patent Number: 6,035,128
[45] Date of Patent: Mar. 7, 2000

[54] ONE-TIME-USE CAMERA WITH HINGE-CONNECTED FRONT AND REAR COVER PARTS

[75] Inventors: Michael L. DeCecca, Fairport; Mark A. Lamphron, Rochester; David Cipolla, Macedon, all of N.Y.

[73] Assignee: Eastman Kodak Company, Rochester, N.Y.

[21] Appl. No.: 09/252,042

[22] Filed: Feb. 17, 1999

[51] Int. Cl.⁷ .................................................. G03B 17/24
[52] U.S. Cl. ............................................. 396/6; 396/536
[58] Field of Search ........................................ 396/6, 536

[56] References Cited

U.S. PATENT DOCUMENTS

| | | |
|---|---|---|
| 4,803,504 | 2/1989 | Maeno et al. ............................ 396/25 |
| 5,255,041 | 10/1993 | Lyon et al. . |
| 5,436,685 | 7/1995 | Yamashina . |
| 5,729,768 | 3/1998 | Fields et al. .............................. 396/6 |
| 5,893,652 | 4/1999 | Stanchus et al. ....................... 396/536 |

*Primary Examiner*—David M. Gray
*Attorney, Agent, or Firm*—Roger A. Fields

[57] ABSTRACT

A one-time-use camera comprising a main body part, and a pair of front and rear cover parts that house the main body part between them, is characterized in that the front and rear cover parts have integral hinge portions with aligned openings, and a hinge pin is positioned in the openings to permit the front and rear cover parts to be pivoted away from one another to access the main body part, and is constructed of the same material as the front and rear cover parts to permit the hinge pin to be ground up together with the front and rear cover parts, without removing the hinge pin from the openings, to form a common substance that can be molded into new cover parts.

10 Claims, 3 Drawing Sheets

ONE-TIME-USE CAMERA WITH HINGE-CONNECTED FRONT AND REAR COVER PARTS

FIELD OF THE INVENTION

The invention relates generally to the field of photography, and in particular to one-time-use cameras. More specifically, the invention relates to a one-time-use camera with hinge-connected front and rear cover parts.

BACKGROUND OF THE INVENTION

Film and cameras that are all in one; commonly referred to as single-use or one-time-use cameras, have become well known. The one-time-use camera is a simple point-and-shoot type comprising an opaque plastic main body part which supports a conventional film cartridge in a cartridge receiving chamber, an unexposed film roll prewound on a film spool in a film supply chamber, a fixed-focus taking lens, a film metering mechanism with a rotatably supported metering sprocket that engages the filmstrip, a manually rotatable film winding thumbwheel rotatably engaged with a film spool inside the film cartridge, a single-blade shutter, a manually depressible shutter release button, a rotatable frame counter for indicating the number of exposures remaining to be made on the filmstrip, a direct see-through viewfinder, and in some models an electronic flash. A pair of opaque plastic front and rear cover parts house the main body part between them to complete the camera unit. The rear cover part connects to the main body part and/or to the front cover part to make the main body part light-tight. A decorative cardboard outer box or label at least partially covers the camera unit and has respective openings for the taking lens, etc.

After each picture is taken with the one-time-use camera, the photographer manually rotates the thumbwheel in a film winding direction to similarly rotate the film spool inside the film cartridge. This winds an exposed section of the filmstrip into the film cartridge. The rewinding movement of the filmstrip the equivalent of slightly more than one frame width rotates the metering sprocket in engagement with the filmstrip to decrement the frame counter to its next lower-numbered setting and to pivot a metering lever into engagement with the thumbwheel in order to prevent further manual rotation of the thumbwheel. Manually depressing the shutter release button to take another picture pivots the metering lever out of engagement with the thumbwheel to permit renewed rotation of the thumbwheel. When the maximum number of exposures available on the filmstrip have been made, and the filmstrip is completely wound into the film cartridge, the one-time-use camera is given to a photofinisher who tears the outer box off the camera unit, separates the rear cover part from the main body part, and removes the film cartridge with the exposed filmstrip from the cartridge receiving chamber. Then, he removes the exposed filmstrip from the film cartridge to develop the negatives and make prints for the customer.

At least some of the used camera parts such as the main body part may be recycled, i.e. reused, to remanufacture the camera. Other used camera parts such as the front and rear cover parts are discarded. Typically, the used camera parts are ground up and the ground plastic material is used in molding new camera parts.

SUMMARY OF THE INVENTION

A one-time-use camera comprising a main body part, and a pair of front and rear cover parts that house the main body part between them, is characterized in that:

the front and rear cover parts have integral hinge portions with aligned openings; and a hinge pin is positioned in the openings to permit the front and rear cover parts to be pivoted away from one another to access the main body part, and is constructed of the same material as the front and rear cover parts to permit the hinge pin to be ground up together with the front and rear cover parts, without removing the hinge pin from the openings, to form a common substance that can be molded into new cover parts.

DETAILED DESCRIPTION OF THE INVENTION

The invention is disclosed as being embodied preferably in a one-time-use camera. Because the features of a one-time-use camera are generally known, the description which follows is directed in particular only to those elements forming part of or cooperating directly with the disclosed embodiment. It is to be understood, however, that other elements may take various forms known to a person of ordinary skill in the art.

Figure 1:
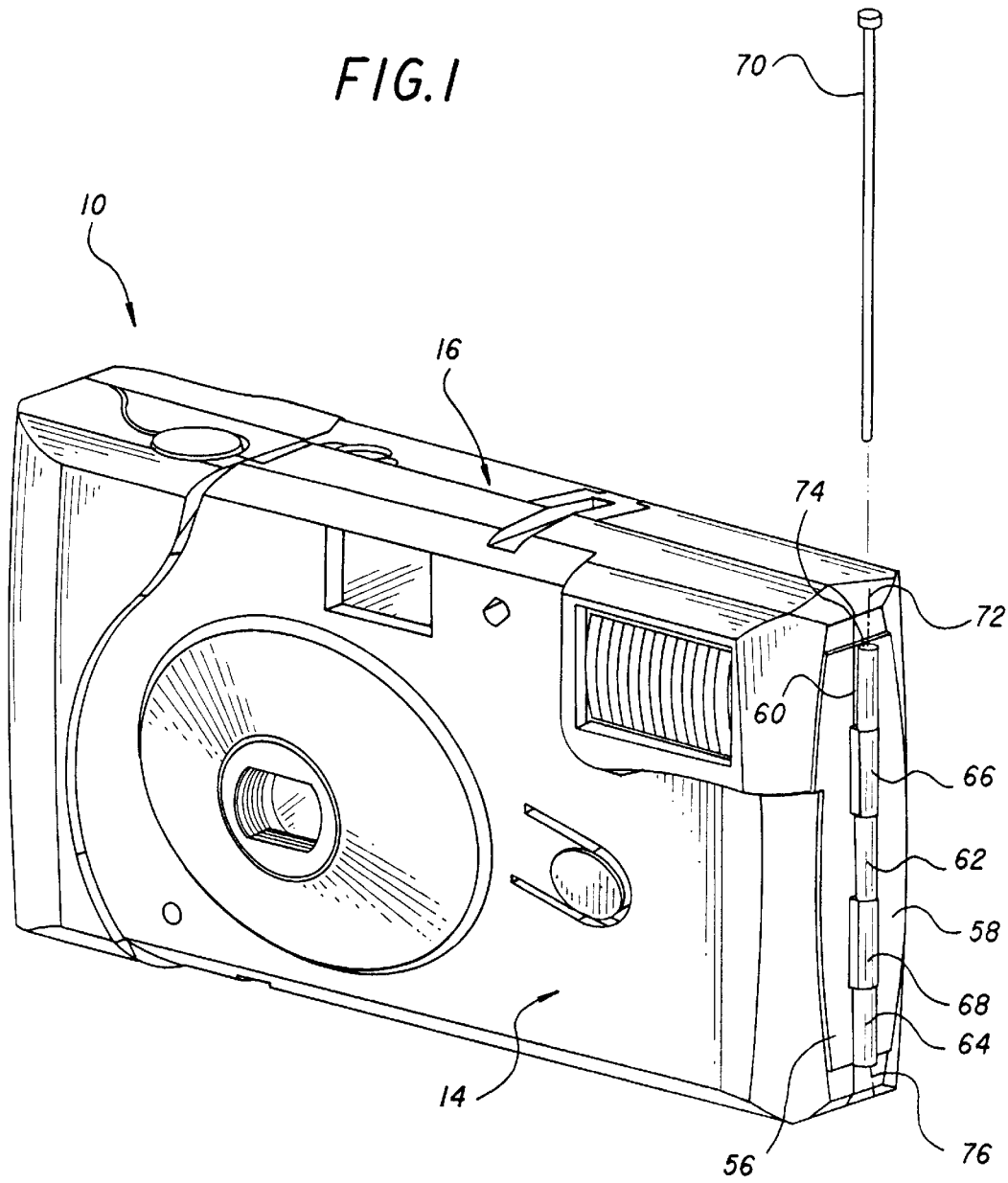
FIG. 1 is a front perspective view of a one-time-use camera consistent with a preferred embodiment of the invention.
Figure 2:
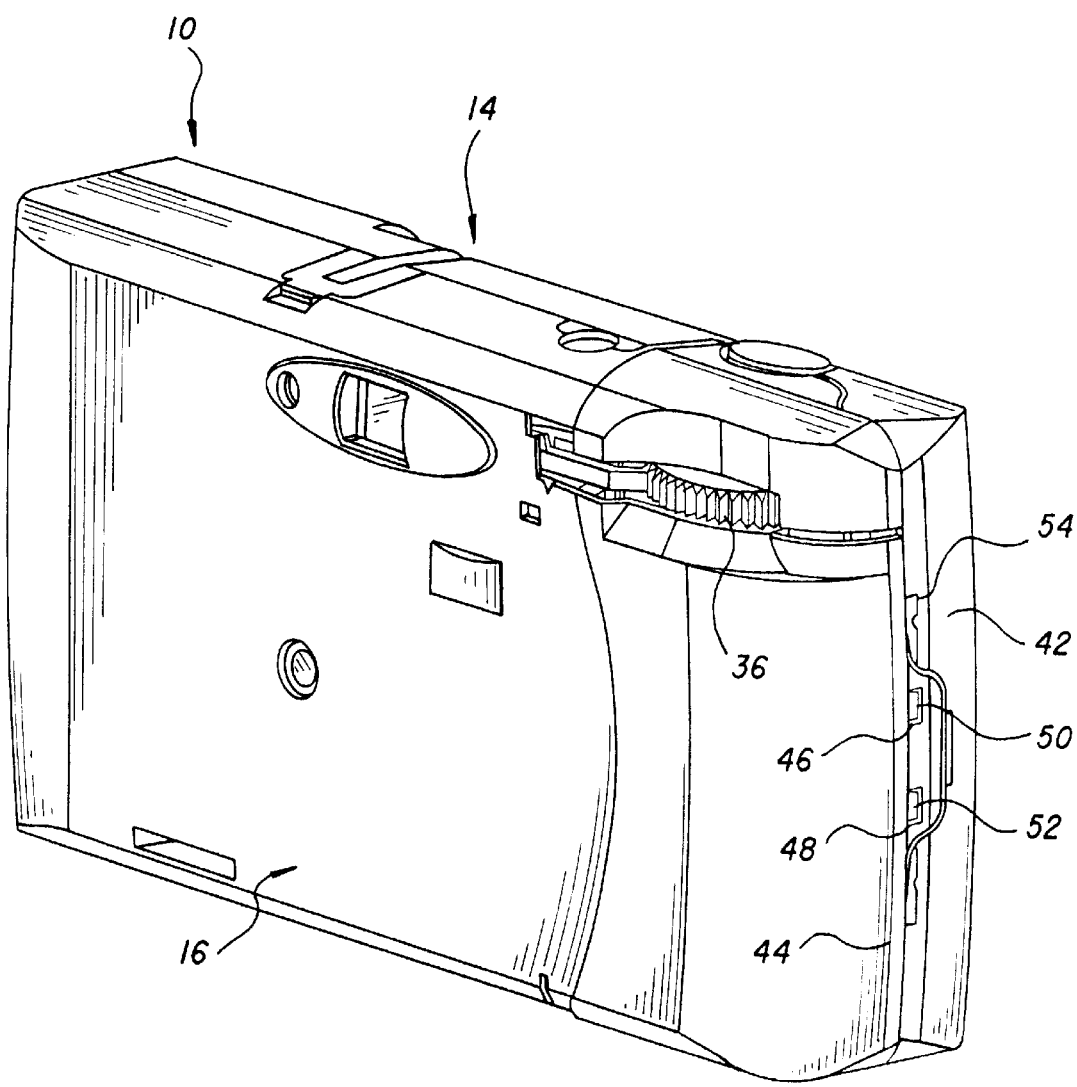
FIG. 2 is a rear perspective view of the one-time-use camera as shown in FIG. 1.
Figure 3:
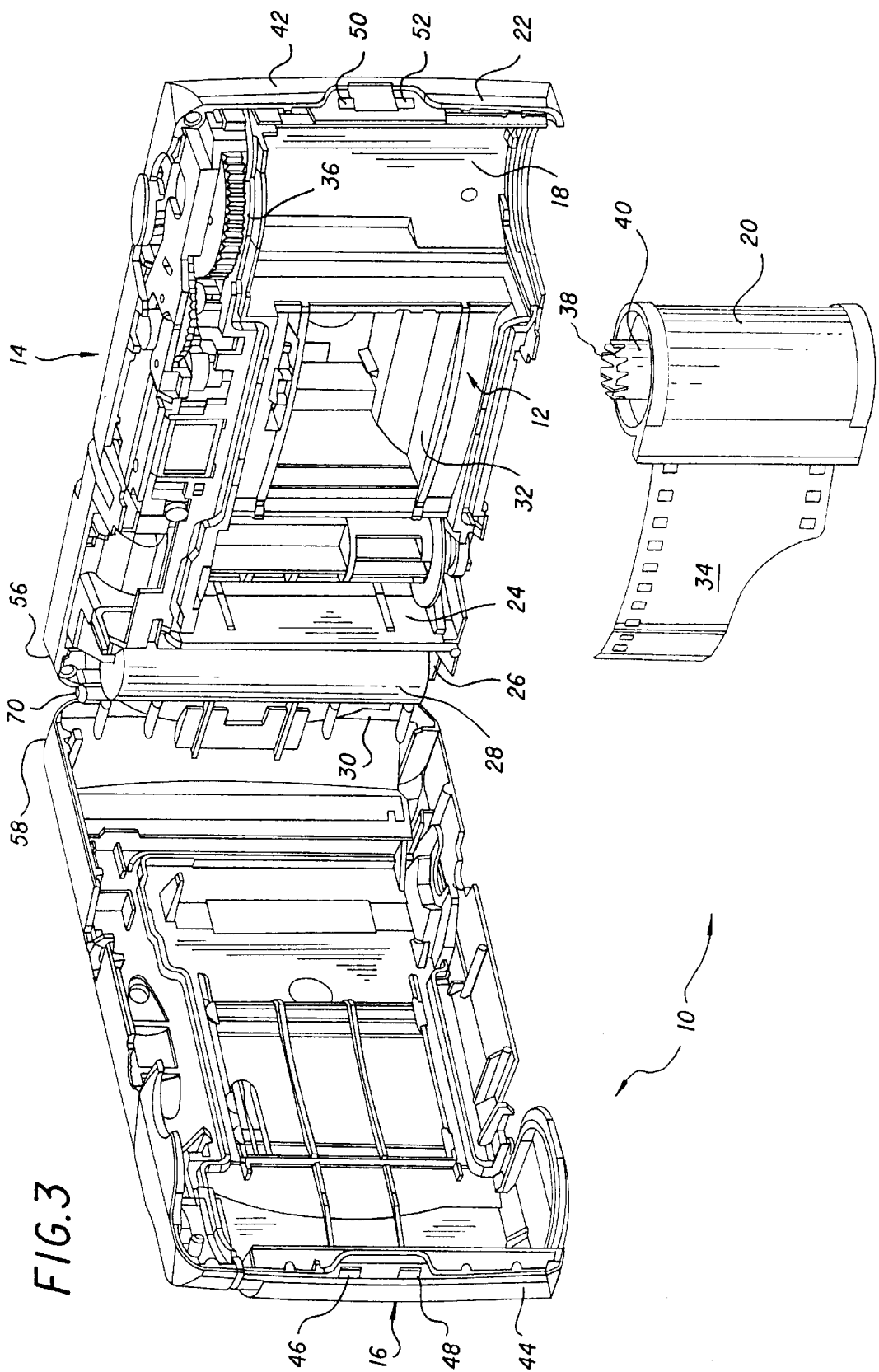
FIG. 3 is a rear perspective view of the camera shown opened with a film cartridge removed.

Referring now to the drawings, FIGS. 1–3 show a one-time-use camera 10 in which an opaque plastic main body part 12 is housed in a pair of opaque plastic front and rear cover parts 14 and 16.

The main body part 12 has a rearwardly open cartridge receiving chamber 18 for a film cartridge 20 next to one end 22 of the main body part, a rearwardly open film supply chamber 24 for an unexposed film roll (not shown), and a rearwardly open battery chamber 26 for a single battery 28 next to another (opposite) end 30 of the main body part. See FIG. 3. A backframe opening 32 is located between the cartridge receiving chamber 18 and the film supply chamber 24 for exposing successive imaging sections of a filmstrip 34 initially stored on the unexposed film roll. A film winding thumbwheel 36 is rotatably supported on the main body part 12 and has a depending coaxial stem (not shown) in coaxial engagement with one end 38 of a film spool 40 in the film cartridge 20. Manual winding rotation of the thumbwheel 36 counter-clockwise in FIG. 3 similarly rotates the film spool 40 to wind each exposed section of the filmstrip 34 into the film cartridge 20.

The front and rear cover parts 14 and 16 are securely connected to one another at adjoining ends 42 and 44 over the one end 22 of the main body part 12 as shown in FIGS. 2 and 3 via a pair of spaced end holes 46 and 48 in the rear cover part and a pair of spaced end hooks 50 and 52 on the front cover part. The end holes 46 and 48 and the end hooks 50 and 52 are arranged in a single row 54 along the adjoining ends 42 and 44. See FIG. 2. The end hooks 50 and 52 are engagingly received in the end holes 46 and 48 to independently connect the front and rear cover parts 14 and 16, and are resiliently supported to permit them to be individually removed from the end holes to disconnect the front and rear cover parts at their adjoining end 42 and 44.

The front and rear cover parts 14 and 16 are hinge-connected to one another at adjoining ends 56 and 58 over the one end 30 of the main body part 12 as shown in FIGS. 1 and 3 via three integral hinge portions 60, 62 and 64 of the front cover part, two integral hinge portions 66 and 68 of the rear cover part and a separate hinge pin 70. The five hinge portions 60, 62, 64, 66 and 68 are arranged in a single row 72 along the adjoining ends 56 and 58 and parallel to the row 54 of the end holes 46 and 48 and the end hooks 50 and 52 and have respective aligned openings 74. The hinge pin 70 is positioned in the aligned openings 74 and is fixed only to the one hinge portion 64 at the end 76 of the row 72 to allow the front and rear cover parts 14 and 16 to be pivoted open about the hinge pin and to prevent removal of the hinge pin from the other hinge portions 60, 62, 66 and 68 in the row. See FIG. 1.

To close the one-time-use camera 10 after the film cartridge 20 is loaded into the cartridge receiving chamber 18, first the front and rear cover parts 14 and 16 are pivoted closed about the hinge pin 70, and then the end hooks 50 and 52 are successively positioned in the end holes 46 and 48

To open the one-time-use camera 10 in order to remove the film cartridge 20 from the cartridge receiving chamber 18, first the end hooks 50 and 52 are successively removed from the end holes 46 and 48, and then the front and rear cover parts 14 and 16 are pivoted open about the hinge pin 70.

The hinge pin 70 is constructed of the same material, i.e. opaque plastic, as the front and rear cover parts 14 and 16 to permit the hinge pin to be ground up together with the front and rear cover parts, without removing the hinge pin from the aligned openings 74, to form a common substance that can be molded into new cover parts.

The invention has been described with reference to a preferred embodiment. However, it will be appreciated that variations and modifications can be effected by a person of ordinary skill in the art without departing from the scope of the invention.

Parts List 10. one-time-use camera
12. main body part
14. front cover part
16. rear cover part
18. cartridge receiving chamber
20. film cartridge
22. body end
24. film supply chamber
26. battery chamber
28. battery
30. end
32. backframe opening
34. filmstrip
36. thumbwheel
38. spool end
40. film spool
42. adjoining end
44. adjoining end
46. end hole
48. end hole
50. end hook
52. end hook
54. row
56. adjoining end
58. adjoining end
60. hinge portion
62. hinge portion
64. hinge portion
66. hinge portion
68. hinge portion
70. hinge pin
72. row
74. aligned openings
76. end

What is claimed is:

1. A one-time-use camera comprising a main body part, and a pair of front and rear cover parts that house said main body part between them, is characterized in that:

said front and rear cover parts have integral hinge portions with aligned openings; and a hinge pin is positioned in said openings to permit said front and rear cover parts to be pivoted away from one another to access said main body part, and is constructed of the same material as said front and rear cover parts to permit said hinge pin to be ground up together with the front and rear cover parts, without removing the hinge pin from the openings, to form a common substance that can be molded into new cover parts.

2. A one-time-use camera as recited in claim 1, wherein said hinge portions are arranged in a single row to align said openings, and said hinge pin is fixed only to one hinge portion at an end of the row to allow said front and rear cover parts to be pivoted about the hinge pin and to prevent removal of the hinge pin from the openings in other hinge portions in the row.

3. A one-time-use camera as recited in claim 1, wherein said main body part has a cartridge receiving chamber next to one end of the main body part, said front and rear cover parts have adjoining ends over said end of the main body part next to said cartridge receiving chamber and at least two separate engagements arranged in a single row along said adjoining ends over the end of the main body part next to the cartridge receiving chamber which can be independently disengaged to permit the front and rear cover parts to be pivoted away from one another to access the cartridge receiving chamber, and said hinge portions are arranged in a row parallel to the row of said separate engagements at adjoining ends of said front and rear cover parts over another end of said main body part that is opposite from said end of the main body part next to said cartridge receiving chamber.

4. A one-time-use camera as recited in claim 3, wherein there are at least four of said hinge portions.

5. A one-time-use camera as recited in claim 3, wherein said separate engagements each include a mating end hook and end hole on said front and rear cover parts.

6. A one-time-use camera comprising a main body part, and a pair of front and rear cover parts that house said main body part between them, is characterized in that:

said front and rear cover parts have a first-end pair of adjoining ends with a hinge connection to permit at least one of the front and rear cover parts to be pivoted open relative to the other to access said main body part, and they have an opposite-end pair of adjoining ends with at least two separate engagements which are independently disengageable to permit the front and rear cover parts to be pivoted.

7. A one-time-use camera as recited in claim 6, wherein said hinge connection is arranged in a single row along said first-end pair of adjoining ends, and said separate engagements are arranged in a single row along said opposite-end pair of adjoining ends and parallel to said row in which said hinge connection is arranged.

8. A method of recycling a used one-time-use camera that includes a main body part, a pair of front and rear cover parts housing the main body part between them and having integral hinge portions with aligned openings, and a hinge pin positioned in the openings to permit the front and rear cover parts to be pivoted away from one another to access the main body part and constructed of the same material as the front and rear cover parts, said method comprising:

separating the main body part from the front and rear cover parts to permit the main body part to be reused; and grinding up the hinge pin together with the front and rear cover parts, without removing the hinge pin from the openings, to form a common substance that can be molded into new cover parts.

9. A method of opening a used one-time-use camera that includes a main body part, a pair of front and rear cover parts housing the main body part between them and having a hinge connection to permit the front and rear cover parts to be pivoted away from one another to access the main body part and at least two separate engagements that can be independently disengaged to permit the front and rear cover parts to be pivoted away from one another, said method comprising:

disengaging one of the engagements;

disengaging the remaining engagements; and pivoting at least one of the front and rear cover parts at the hinge connection to access the main body part.

10. A method of manufacturing a used one-time-use camera that includes a main body part having a cartridge receiving chamber, a pair of front and rear cover parts housing the main body part between them and having a hinge connection to permit at least one of the front and rear cover parts to be pivoted closed relative to the another and at least two separate engagements that can be independently engaged to secure the front and rear cover parts closed to prevent them from being pivoted, said method comprising:

loading a film cartridge into the cartridge receiving chamber in the main body part;

pivoting at least one of the front and rear cover parts closed at the hinge connection;

engaging one of the engagements; and engaging the remaining engagements.

\* \* \* \* \*